(12) United States Patent  (10) Patent No.: US 7,544,032 B1
Scott, Jr.  (45) Date of Patent: Jun. 9, 2009

(54) DEER HOIST FOR AN ALL TERRAIN VEHICLE

(76) Inventor: Earl Scott, Jr., 1745 Louis La., Bogalusa, LA (US) 70427

( * ) Notice: Subject to any disclaimer, the term of this patent is extended or adjusted under 35 U.S.C. 154(b) by 1092 days.

(21) Appl. No.: 10/217,992

(22) Filed: Jul. 31, 2002

(51) Int. Cl.
B60P 9/00 (2006.01)
(52) U.S. Cl. ........................................ 414/462; 280/847
(58) Field of Classification Search ................ 414/462, 414/550; 280/847, 851, 154
See application file for complete search history.

(56) References Cited

U.S. PATENT DOCUMENTS

| | | | | |
|---|---|---|---|---|
| 4,419,038 A * | 12/1983 | Pendergraft | .................. | 414/543 |
| 5,211,526 A * | 5/1993 | Robinette | .................... | 414/550 |
| 5,427,471 A * | 6/1995 | Godbersen | ...................... | 405/3 |
| 5,662,451 A * | 9/1997 | Muzzi et al. | ................ | 414/540 |
| 5,752,799 A * | 5/1998 | Carey et al. | .................. | 414/543 |
| 5,810,542 A * | 9/1998 | Ostrander | ................... | 414/462 |
| 5,853,282 A * | 12/1998 | Bechler et al. | .............. | 414/543 |
| 6,109,855 A * | 8/2000 | Vela-Cuellar | ............... | 414/462 |
| 6,155,771 A * | 12/2000 | Montz | ........................ | 414/543 |
| 6,203,078 B1 * | 3/2001 | Karrer | ...................... | 293/111.1 |
| 6,250,483 B1 * | 6/2001 | Frommer | ..................... | 212/180 |
| 6,312,210 B1 * | 11/2001 | Lang | .......................... | 414/540 |
| 6,394,475 B1 * | 5/2002 | Simon | ........................ | 280/154 |
| 6,478,528 B1 * | 11/2002 | Asbury | ....................... | 414/550 |
| 6,485,059 B2 * | 11/2002 | Burnstein | ................... | 280/851 |
| 6,626,748 B2 * | 9/2003 | Homer, Sr. | .................. | 452/189 |
| 6,769,858 B1 * | 8/2004 | Butler et al. | ................ | 414/462 |
| 6,821,075 B2 * | 11/2004 | van der Horn | .............. | 414/462 |
| 2002/0048504 A1 * | 4/2002 | Jacobs | ........................ | 414/541 |
| 2003/0007855 A1 * | 1/2003 | van der Horn | .............. | 414/543 |

* cited by examiner

Primary Examiner—Gregory W Adams
(74) Attorney, Agent, or Firm—Kenneth L Tolar

(57) ABSTRACT

A deer hoist for an all terrain vehicle includes a transverse mounting bar adapted to be attached to a trailer hitch drawbar on the vehicle. A beam vertically extends from the mounting bar and has a horizontal arm extending therefrom. A brake wench mounted on the vertical beam operates a cable along a plurality of pulleys disposed on the horizontal arm. A gambrel is secured to a distal end of the cable for suspending a deer. A width and height adjustable outrigger assembly is attached to the transverse mounting bar to prevent the all terrain vehicle from toppling when a load is placed on the hoist. The outrigger assembly can be conveniently disassembled and stored on the hoist when not in use. The hoist also includes an accessory rack and light for remote use.

20 Claims, 4 Drawing Sheets

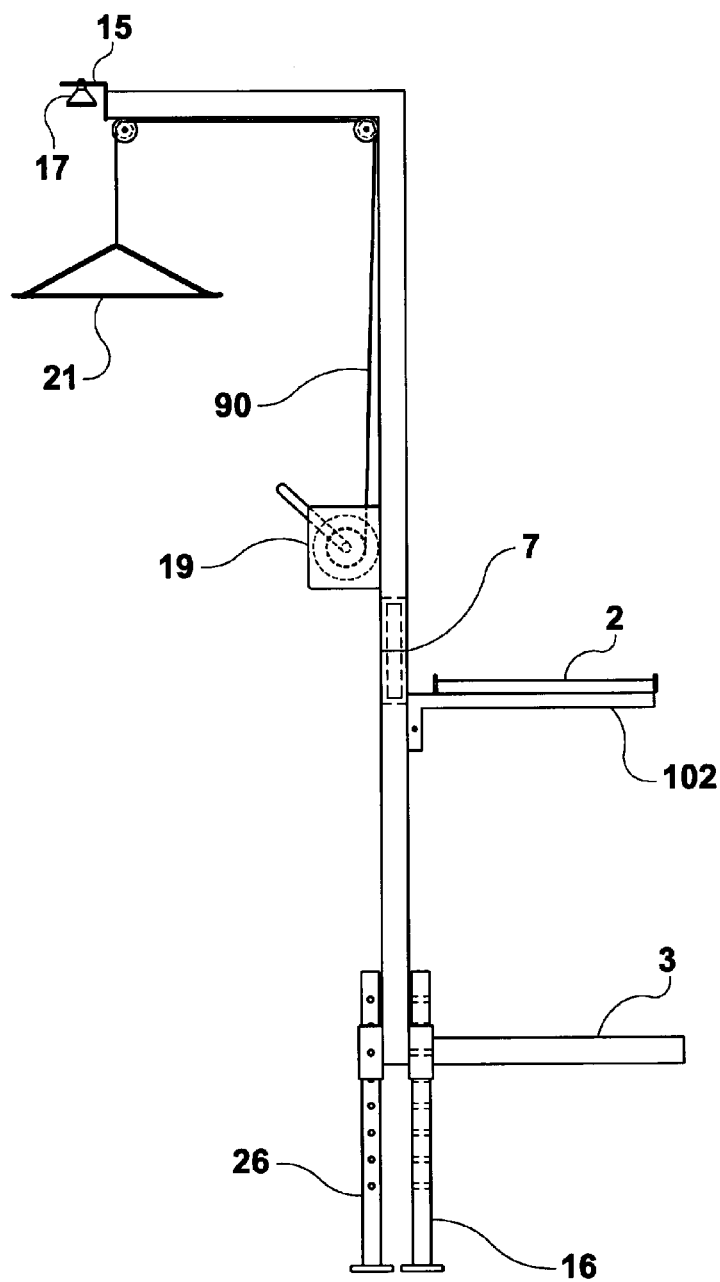
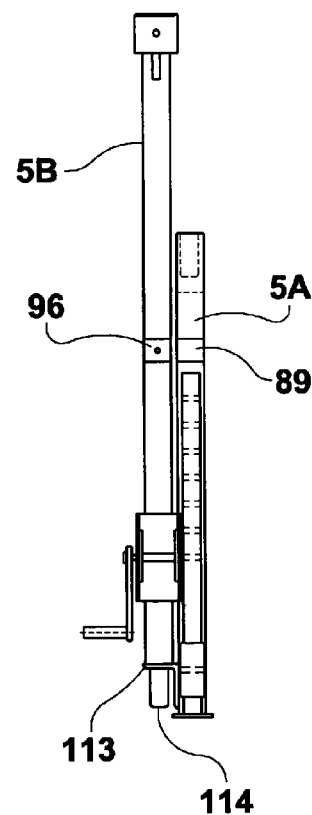

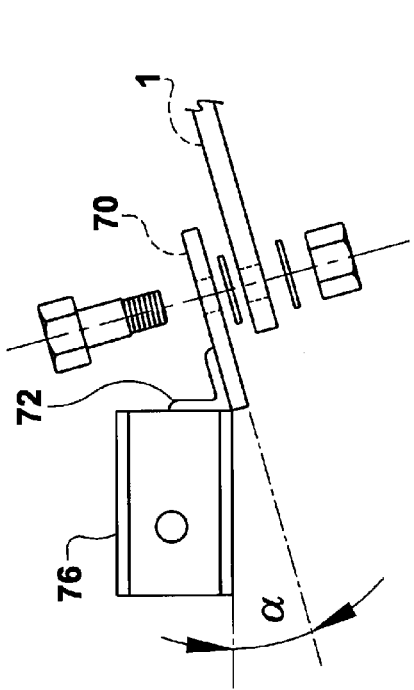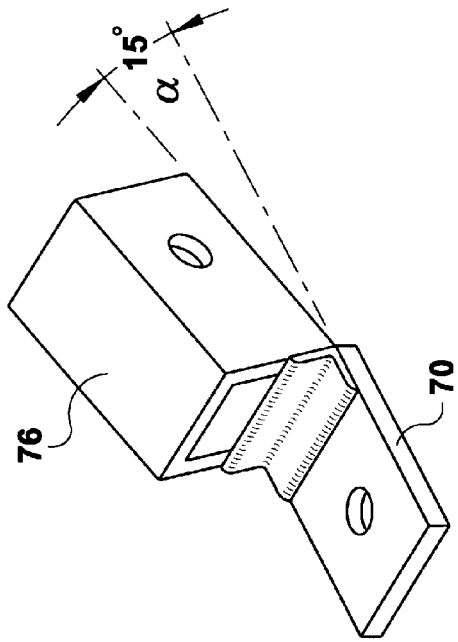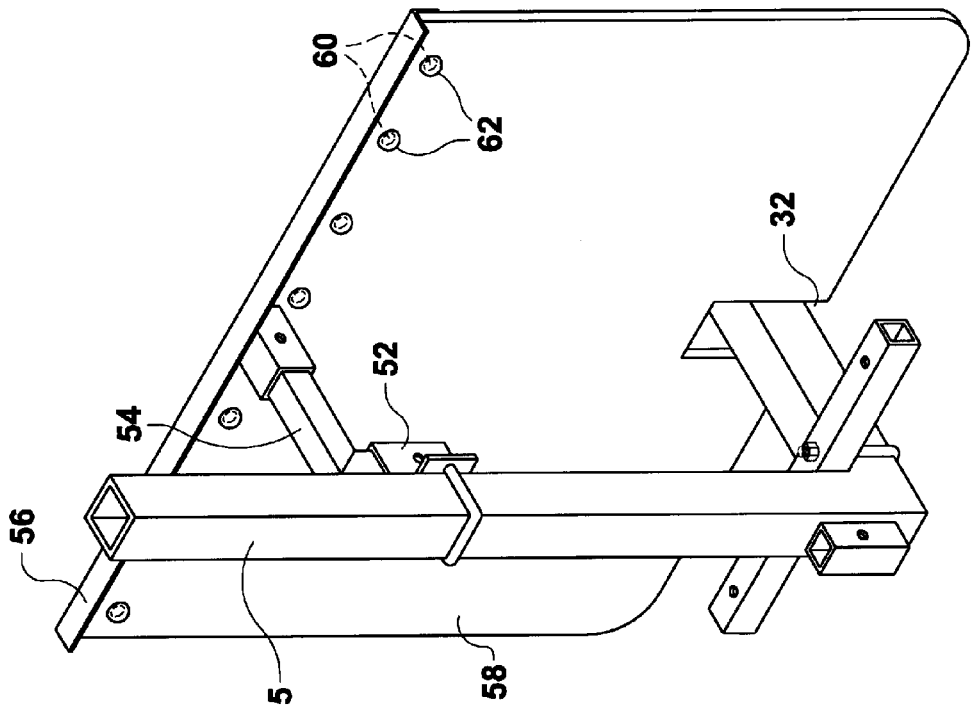

DEER HOIST FOR AN ALL TERRAIN VEHICLE

BACKGROUND OF THE INVENTION

The present invention relates to a deer hoist specifically adapted to be mounted on an all terrain vehicle (ATV) for assisting a hunter in lifting and skinning a deer.

DESCRIPTION OF THE PRIOR ART

Hunters often use all terrain vehicles to travel to and from remote locations such as blinds or stands since such locations are typically inaccessible with conventional vehicles. However, all terrain vehicles are notoriously dangerous due to their susceptibility to overturning.

Furthermore, once an animal is killed, a hunter will typically skin the animal by suspending it on a hoisting device attached to a vehicle. However, until now, conventional hoisting devices could not be safely used with ATV's because the weight of the animal would almost certainly overturn the vehicle. Although numerous game hoists exist in the prior art, they have been designed to be used with larger vehicles such as trucks where overturning is not an issue. For example, U.S. Pat. No. 4,419,038 issued to Pendergraft discloses a bumper mounted foldable hoist including a support structure mounted beneath a truck bed with an elongated column vertically extending therefrom. An elongated boom extends horizontally from the top of the column. A pair of outrigger screw jacks are securable to opposing ends of the support structure. The device can be folded into the support structure when not in use.

U.S. Pat. No. 4,930,970 issued to Sunderland discloses a hoist composed of various frame members that are pivotally and slidably connected to each other so that an unassisted individual can assemble/disassemble the device.

U.S. Pat. No. 5,862,926 issued to Johnson discloses a hoist for a pick up truck including a front frame and a rear frame attached to the truck bed. An I-beam interconnects the frame members and includes a winch mounted thereon.

U.S. Pat. No. 5,540,537 issued to Welch discloses a portable hoist including a central post connected to a trailer hitch draw bar.

U.S. Pat. No. 6,202,868 issued to Murray discloses a collapsible hoist.

As indicated above, numerous hoisting devices attachable to vehicles exist in the prior art. However, as discussed above, none of these devices have been designed for use with an ATV; as such none include means for properly stabilizing the vehicle as it is lifting a deer. Although the patent issued to Pendergraft discloses an outrigger stabilizing assembly, the assembly includes a pair of screw jacks each having a lug fitting that is inserted into an opening on a hollow, bumper mounted support structure. The support structure is not designed for use with an ATV; the tenuous connection of the support structure and screw jacks could not possibly stabilize an all terrain vehicle against the weight of a deer. Furthermore, the outrigger assembly is not laterally adjustable and is only marginally adjustable in height.

Each of the above-described devices also attach to a conventional trailer hitch receiver on a vehicle. However, conventional ATV drawbars are typically horizontal and are situated a relatively short distance above the ground. Accordingly, when a hoist is mounted on a conventional ATV drawbar, the weight of the hoist causes it to encroach or engage the ground.

The present invention overcomes many of the disadvantages associated with the prior art by providing a deer hoist having an outrigger stabilizing assembly specifically designed for an ATV that prevents the ATV from overturning whenever the hoist is lifting or suspending a deer. The stabilizing assembly is both vertically and horizontally adjustable so as to be adaptable to a wide variety of terrains and loads. The entire hoist can be easily disassembled and stored without detaching it from the vehicle draw bar eliminating the need to transport or store the device elsewhere. Furthermore, because the present invention is specifically designed to assist a hunter in immediately skinning a deer at the hunting site, it is equipped with an ice chest/accessory rack for storing necessities and a light for twilight or night use. A mud flap assembly can be secured to the hoist for protecting the outrigger stabilizing legs, the brake wench and other components from mud, water and other debris that may be projected by the ATV tires. Finally, the device also includes a uniquely designed drawbar adapter having a receiver that extends upwardly at an angle to provide maximum clearance between the hoist and the ground whenever the hoist is mounted on the vehicle.

SUMMARY OF THE INVENTION

The present invention relates to a deer hoist particularly designed for use with an ATV. The device includes a transverse mounting bar attachable to a drawbar mounted on the rear of an ATV. The transverse mounting bar is fastened to the receiver hitch using any conventional means, or using a uniquely designed drawbar adapter that forms part of the present invention. Vertically extending from the transverse mounting bar is a beam having a horizontal arm extending from the upper end thereof. Mounted on the transverse mounting bar and positioned immediately adjacent the vertical beam is an outrigger stabilizing device that minimizes overturning of the ATV when the hoist is lifting or suspending an animal. A brake wench is attached to the beam for extending and retracting a cable or rope along a plurality of pulleys positioned on the horizontal arm. A gambrel on a distal end of the cable suspends a deer. The device also includes a light for night use and an ice chest/auxiliary rack for supporting an ice chest or any other accessory items.

It is therefore an object of the present invention to provide a deer hoist specifically adapted for use with an all terrain vehicle.

It is another object of the present invention to provide a deer hoist having a compactly storable outrigger device for stabilizing the hoist when lifting heavy objects.

It is yet another object of the present invention to provide a deer hoist having an auxiliary rack attached thereto for conveniently supporting accessory items.

It is yet another object of the present invention to provide a deer hoist having a uniquely designed drawbar adapter that assures maximum ground clearance when the device is secured to an ATV.

Other objects, features and advantages of the present invention will become readily apparent from the following detailed description of the preferred embodiment when considered with the attached drawings and the appended claims.

BRIEF DESCRIPTION OF THE DRAWINGS

FIG. 4 is a side view of the deer hoist according to the present invention.

FIG. 5 is a plan view of the vertical beam in a separated, stored configuration.

FIG. 6 is a perspective view of the mud flap assembly.

FIG. 7 is a side view of the drawbar adapter assembly.

FIG. 8 is a detailed view of the adapter assembly receiver.

DESCRIPTION OF THE PREFERRED EMBODIMENT

Figure 1:
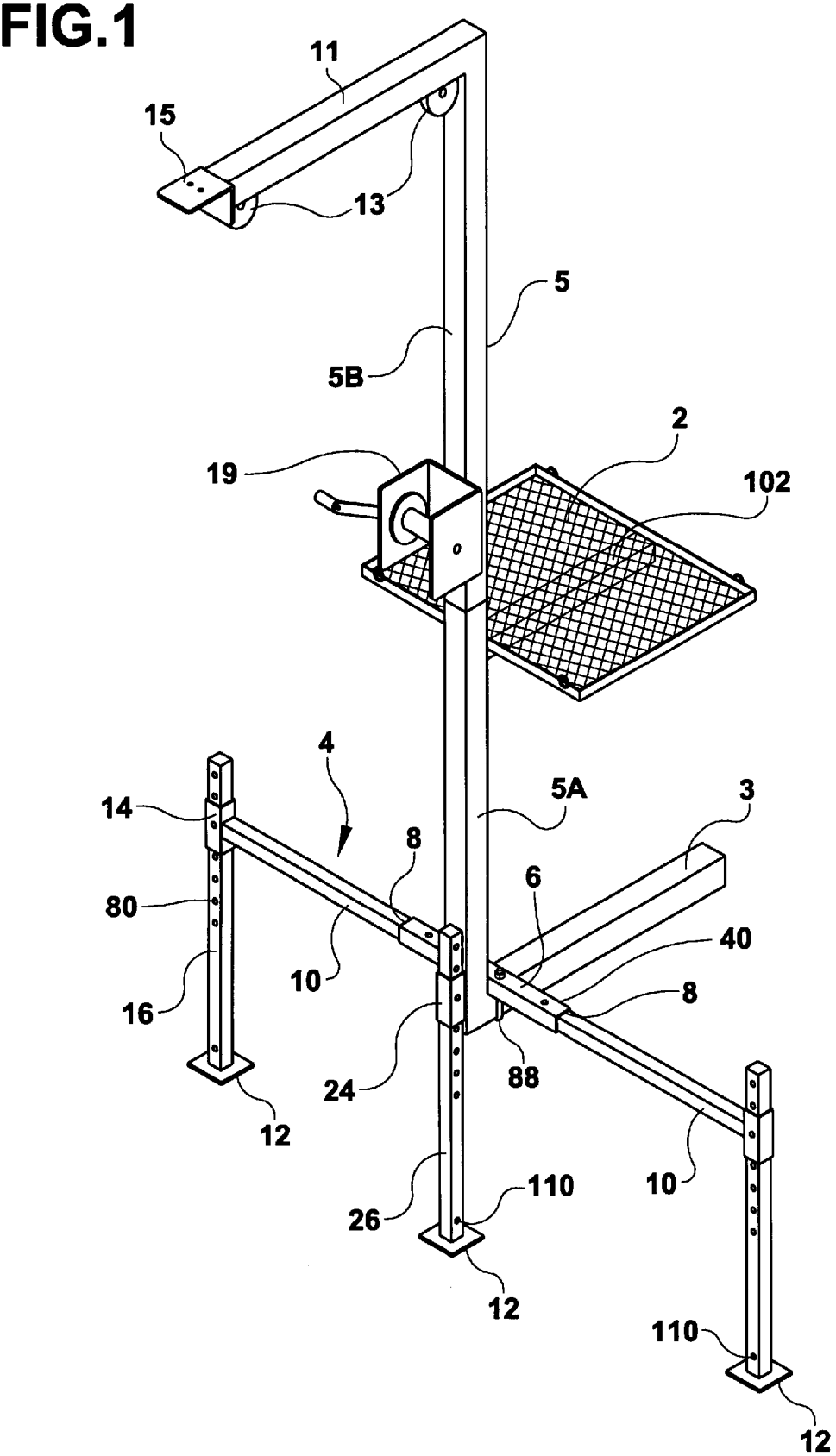
FIG. 1 is a perspective view of the deer hoist according to the present invention.

Now referring to FIG. 1, the present invention relates to a deer hoist particularly adapted to be used with an all terrain vehicle (ATV). The hoist includes a horizontal transverse mounting bar 3 having means for attaching to a trailer hitch drawbar 1 on the vehicle. The transverse bar is secured to the draw bar using any conventional means such as locking pins, bolts, etc. However, most ATV's are equipped with flat drawbars to which a trailer hitch ball is attached, as opposed to a conventional receiver hitch as found on many larger vehicles. In such event, a receiver hitch must be attached to the drawbar into which the transverse bar is inserted. However, conventional receiver hitches will not adequately support a hoist when attached to an ATV. Accordingly, the present invention also includes a uniquely designed drawbar adapter assembly described in more detail, infra.

Extending upwardly from a distal end of the mounting bar is a vertical beam 5 that terminates at an upper end. Preferably the beam is formed from a pair of separable sections 5A, 5B that are joined with a dowel type connection 7 or any other similar means that allows the sections to be separated and independently rotated. Accordingly, the upper beam section and the horizontal arm may be swiveled relative to the all terrain vehicle to assist a user in positioning the hoist, for example, to load a deer onto the ATV.

As depicted in FIG. 5, a flange 89 extends from the lower beam section 5A and includes an aperture 96 thereon. The aperture is aligned with a similar aperture on the upper beam section 5B and a locking pin is inserted therein. In addition, a plate 113 horizontally extends from the lower beam section. The plate includes an opening that receives a male portion 114 of the dowel connection on an end of the upper beam section. Accordingly, the upper beam section is separated from the lower beam section and the male portion of the dowel is inserted into the plate opening. The aperture on the upper section is aligned with the aperture on the flange and the pin is inserted therein allowing the beam to be compactly stored without removing the hoist from the vehicle.

Horizontally extending from the upper end of the beam, in a direction opposite the ATV, is a horizontal arm 11 having a plurality of pulleys 13 mounted thereon. A brake wench 19 extends and retracts a cable 90 or rope along the pulleys. The cable includes a gambrel 21 at a distal end for securing to a deer or other animal to be lifted.

Secured to the distal end of the arm is an L-shaped bracket 15 to which a DC powered light 17 is mounted for assisting a user in operating the device at night. The light is preferably powered using conventional vehicle trailer light wiring, though any other conventional power sources can be used. An accessory rack 2 is mounted on a support brace 102 that is fastened to one of the beam sections for supporting an ice chest or other accessory item.

Positioned at the lower end of the lower beam section is an outrigger assembly 4 for preventing the all terrain vehicle from toppling whenever the hoist is lifting a deer. Specifically referring to FIGS. 1 through 4, the outrigger assembly includes a sleeve 6 horizontally positioned on the mounting bar immediately adjacent its intersection with the beam. Preferably, the horizontal sleeve is removably attached to the transverse mounting bar with a U-bolt 88 or similar fastener so that the outrigger assembly can be detached and used with other hoist assemblies if desired. The sleeve includes a pair of opposed, open ends 8, each of which telescopically receives a horizontal brace member 10. The sleeve and horizontal brace members each have a plurality of longitudinally disposed apertures 40 for receiving a locking pin 101 to secure the brace member within the sleeve at a select position and to allow the width of the outrigger assembly to be selectively adjusted depending upon the load to be placed upon the hoist.

At a distal end of each brace member is a vertical sleeve 14 that telescopically receives an outer stabilizer leg 16. As with the brace members, the outer legs include longitudinally disposed apertures 80 for aligning with an aperture on the vertical sleeve so that the height of the outrigger assembly can be adjusted depending upon the supporting terrain or the load to be lifted. An intermediate vertical sleeve 24 is mounted on the front surface of the beam that receives a central stabilizer leg 26.

Each of the stabilizer legs has a foot pad 12 at its lower end for anchoring the legs to the ground. An aperture 110 is positioned adjacent each foot pad for securing the leg in a completely retracted position for transport or storage.

Figure 2:
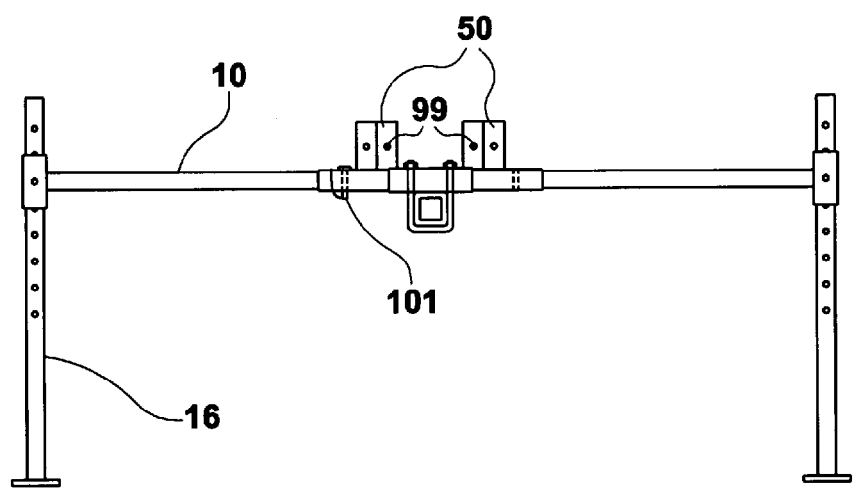
FIG. 2 is a rear, plan view of the outrigger stabilizing assembly.
Figure 3:
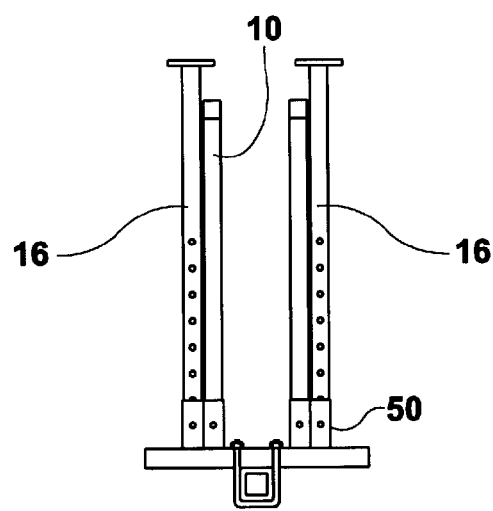
FIG. 3 is a detailed view of the outrigger stabilizing assembly in a stored configuration.

Now referring specifically to FIGS. 2 and 3, the outrigger assembly described above may be disassembled and compactly stored on the hoist when not in use. The horizontal sleeve 6 includes two pairs of juxtaposed vertical storage quills 50 positioned on the upper surface thereof. Each pair of storage quills receives a stabilizer leg and horizontal brace member when not in use as depicted in FIG. 3. The storage quills each have an aperture 99 for receiving a locking pin to secure the legs and/or brace members therein. Accordingly, the outrigger assembly can be quickly disassembled and conveniently stored on the hoist for transport, eliminating the need to store it elsewhere.

Now referring to FIG. 6, a mud flap assembly may be attached to the hoist to protect the brake wench, the beam and other components from dirt, mud, water and other debris that may be projected by the ATV's tires. A receptacle 52 is attached to the beam, preferably at a position beneath the ice chest rack, which receives a support member 54. An elongated strip 56 of angle iron is affixed to the end of the support member. A substantially square, rubber flap 58 includes a plurality of eyelets 60 along an upper edge that receive rivets 62 on the angle iron to removably secure the flap thereto. A lower edge of the flap includes a slot 32 for accommodating the transverse mounting bar so that the flap can extend near the ground to provide maximum protection.

Now referring to FIGS. 7 and 8, the device also includes a uniquely designed drawbar adapter having a mounting strut 70 attachable at one end to the vehicle trailer hitch drawbar 1. At an opposing end of the strut is an angle bracket 72 having a receiver 76 attached thereto. The angle bracket is configured so that the angle, $\alpha$, between the receiver 76 and the strut 70 is approximately fifteen degrees; however, the angle $\alpha$ could be varied to suit a particular application as long as the receiver extends upwardly from the horizontal. The transverse mounting bar 3 is inserted into the receiver 76 secure the hoist to the vehicle. The receiver 76 includes an aperture for receiving a locking pin to secure the mounting bar therein.

The drawbar adapter described above is particularly designed for the hoist according to the present invention. A conventional trailer hitch drawbar on an ATV is low profile and extends horizontally from the rear of the vehicle. When a typical receiver and hoist is mounted on an ATV, the length of the transverse mounting bar in combination with the weight of the hoist, cause the transverse bar to closely approach or engage the ground. Accordingly, driving the ATV with the hoist attached thereto may not be possible. With the above described drawbar adapter assembly, the weight of the hoist will cause the transverse bar to approach a conventional horizontal position, well above the ground.

The above-described device is not to be limited to the exact details of construction and enumeration of parts set forth above. For example, though the mud flap, outrigger and drawbar adapter assemblies are primarily designed for use with the hoist according to the present invention, each of the assemblies can be used individually or in any combination with the other, or with any other conventional hoist assemblies. Furthermore, the size, shape and materials of construction can be varied to suit a particular application.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A deer hoist for an all terrain vehicle comprising:
a transverse mounting bar attachable at a first end to a vehicle trailer hitch drawbar;
a beam vertically extending from a second end of said mounting bar; said beam formed of a pair of separable sections;
an arm horizontally extending from an upper end of said beam;
a winch assembly mounted on said beam;
a laterally adjustable, height adjustable stabilizing means for stabilizing said hoist and for minimizing toppling of said vehicle as said winch is lifting a heavy animal;
a flange extending from one of said beam sections, said flange having an aperture thereon;
an aperture on the other of said beam sections which is aligned with said aperture on said flange;
a locking pin received within each of said apertures to secure said beam sections in a disassembled, stored position;
a plate horizontally extending from one of said beam sections, said plate having an opening;
a male dowel portion on an end of the other of said beam sections, said male dowel portion received within said plate opening to further secure said beam sections in a stored position;
a receptacle attached to said beam;
an elongated support member received within said receptacle and extending outwardly from said beam;
an elongated strip affixed to an end of said support member;
a flap removably attached to said strip for deflecting debris projected from a vehicle's tires.

2. The hoist according to claim 1 wherein said flap includes a lower edge having a slot thereon for accommodating said transverse mounting bar.

3. The deer hoist according to claim 1 wherein said stabilizing means comprises:
a horizontal sleeve positioned on said mounting bar, said sleeve having two opposing open ends;
a brace member telescopically received within each open end of said sleeve;
means for fixing each of said brace members at a select position relative to said sleeve;
a vertical sleeve attached to a distal end of each of said brace members;
an outer stabilizer leg telescopically received within each of said vertical sleeves;
means for fixing each of said legs at a select position relative to said sleeve;
an intermediate, vertical sleeve attached to said beam;
a central stabilizer leg telescopically received within said intermediate sleeve;
means for fixing said leg at a select position relative to said intermediate sleeve.

4. The hoist according to claim 1 wherein said beam sections are joined with a dowel connection which allows each of said beam sections to rotate independently when said beam sections are connected.

5. The hoist according to claim 1 further comprising a light attached to a distal end of said arm.

6. The hoist according to claim 1 further comprising a storage rack affixed to said beam for storing accessory items.

7. The hoist according to claim 3 further comprising two pairs of vertical, juxtaposed storage quills extending from said horizontal sleeve, each pair of quills for respectively receiving a brace member and a leg to store said stabilizing means when not in use.

8. The hoist according to claim 7 wherein said means for fixing each of said brace members at a select position relative to said sleeve includes a plurality of apertures longitudinally disposed along said brace member and said horizontal sleeve and a locking pin received within a select aperture on said brace member and a select aperture on said sleeve aligned therewith.

9. The hoist according to claim 8 wherein said means for fixing each of said legs at a select position relative to said vertical sleeves comprises a plurality of apertures longitudinally disposed on each of said legs and each of said vertical sleeves and a locking pin received within a select one of said apertures on said legs and a select other aperture on said sleeve aligned therewith.

10. The hoist according to claim 1 wherein said winch assembly comprises:
a brake winch mounted on said beam;
a cable operably connected to said brake winch and guided along a predetermined path by at least one pulley mounted on said arm;
a gambrel attached to a distal end of said cable.

11. The hoist according to claim 1 further comprising a drawbar adapter assembly including a mounting strut attachable at a first end to a vehicle drawbar and a receiver attached to a second end of said strut; said receiver obliquely extending at a predetermined angle from said strut; said transverse mounting bar positioned within said receiver.

12. A deer hoist for an all terrain vehicle comprising:
a transverse mounting bar attachable at a first end to a vehicle trailer hitch drawbar;
a beam vertically extending from a second end of said mounting bar; said beam formed of a pair of separable sections;
an arm horizontally extending from an upper end of said beam;
a winch assembly mounted on said beam;
a laterally adjustable, height adjustable stabilizing means for stabilizing said hoist and for minimizing toppling of said vehicle as said winch is lifting a heavy animal;
a flange extending from one of said beam sections, said flange having an aperture thereon;
an aperture on the other of said beam sections which is aligned with said aperture on said flange;

a locking pin received within each of said apertures to secure said beam sections in a disassembled, stored position;

a drawbar adapter assembly including a mounting strut attachable at a first end to a vehicle drawbar and a receiver attached to a second end of said strut; said receiver obliquely extending at a predetermined angle from said strut; said transverse mounting bar positioned within said receiver.

13. The hoist according to claim 12 further comprising:

a plate horizontally extending from one of said beam sections, said plate having an opening;

a male dowel portion on an end of the other of said beam sections, said male dowel portion received within said plate opening to further secure said beam sections in a stored position.

14. The deer hoist according to claim 12 wherein said stabilizing means comprises:

a horizontal sleeve positioned on said mounting bar, said sleeve having two opposing open ends;

a brace member telescopically received within each open end of said sleeve;

means for fixing each of said brace members at a select position relative to said sleeve;

a vertical sleeve attached to a distal end of each of said brace members;

an outer stabilizer leg telescopically received within each of said vertical sleeves;

means for fixing each of said legs at a select position relative to said sleeve;

an intermediate, vertical sleeve attached to said beam;

a central stabilizer leg telescopically received within said intermediate sleeve;

means for fixing said leg at a select position relative to said intermediate sleeve.

15. The hoist according to claim 12 wherein said beam sections are joined with a dowel connection which allows each of said beam sections to rotate independently when said beam sections are connected.

16. The hoist according to claim 12 further comprising a light attached to a distal end of said arm.

17. The hoist according to claim 12 further comprising a storage rack affixed to said beam for storing accessory items.

18. The hoist according to claim 14 further comprising two pairs of vertical, juxtaposed storage quills extending from said horizontal sleeve, each pair of quills for respectively receiving a brace member and a leg to store said stabilizing means when not in use.

19. The hoist according to claim 18 wherein said means for fixing each of said brace members at a select position relative to said sleeve includes a plurality of apertures longitudinally disposed along said brace member and said horizontal sleeve and a locking pin received within a select aperture on said brace member and a select aperture on said sleeve aligned therewith.

20. The hoist according to claim 19 wherein said means for fixing each of said legs at a select position relative to said vertical sleeves comprises a plurality of apertures longitudinally disposed on each of said legs and each of said vertical sleeves and a locking pin received within a select one of said apertures on said legs and a select other aperture on said sleeve aligned therewith.

* * * * *